United States Patent [19]
Marin

[11] Patent Number: 5,122,802
[45] Date of Patent: * Jun. 16, 1992

[54] AUTOMATIC RADAR GENERATOR

[76] Inventor: Jonathan Marin, 11 Schermerhorn St., Apt. 3WA, Brooklyn, N.Y. 11201

[ * ] Notice: The portion of the term of this patent subsequent to Jun. 19, 2007 has been disclaimed.

[21] Appl. No.: 539,806

[22] Filed: Jun. 18, 1990

Related U.S. Application Data

[63] Continuation-in-part of Ser. No. 340,380, Apr. 19, 1989, Pat. No. 4,935,742.

[51] Int. Cl.⁵ .................................. G01S 7/38
[52] U.S. Cl. ............................... 342/13; 342/20
[58] Field of Search ............... 342/13; 20; 455/92, 455/343

[56] References Cited

U.S. PATENT DOCUMENTS

| | | | |
|---|---|---|---|
| 2,521,683 | 9/1950 | Barker | 177/337 |
| 3,891,989 | 6/1975 | Barney et al. | 342/13 |
| 3,895,227 | 7/1975 | Murray et al. | 240/73 R |
| 4,295,131 | 10/1981 | Bonori et al. | 340/554 |
| 4,435,699 | 3/1984 | Tacussel | 340/539 |
| 4,757,304 | 7/1988 | Rho | 340/522 |
| 4,857,917 | 8/1989 | Sato | 455/343 X |

OTHER PUBLICATIONS

"Barriers Remain to Safe Work Zones" by ENR (Apr. 7, 1988).
Federal Communication Newsletter, Report No. 4872, May 19, 1973.
"Antennas at X or K Band Frequencies" by M/A-Com Ga/As Products Inc. MA 86550.
"Radar", News Scope, Dec. 20, 1977.

*Primary Examiner*—Gilberto Barrón, Jr.
*Attorney, Agent, or Firm*—Hamilton, Brook, Smith & Reynolds

[57] ABSTRACT

An autonomous radar transmitting system transmits radar signals which simulate the presence of a police-manned radar station. A system controller runs pseudo-randomizing programs to select signal parameters such as the pulse width and pulse separation as well as the signal power of generated radar signals. The radar output of the system is therefore sufficiently random to prevent a detecting circuit from identifying it in the time it takes for a motorist with a radar detector to reach the radar source. This system is battery powered and a photovoltaic panel is provided to recharge the battery, thus giving the system a long lifespan. The controller detects the battery power level and modifies the parameters of the generated signals in response to low battery levels. A radiation detector is also provided through which radiation signals may be input from a remote control. The input radiation signals may be used to suspend system operation or modify the signal parameters. Thus, external control is provided without making the system susceptible to tampering or vandelism. Most of the electrical components are enclosed in a weatherproof casing capable of being mounted in a number of discrete, convenient locations.

24 Claims, 3 Drawing Sheets

AUTOMATIC RADAR GENERATOR

This is a Continuation-in-part of application Ser. No. 07/340,380, filed Apr. 19, 1989, now U.S. Pat. No. 4,935,742.

BACKGROUND OF THE INVENTION

Traditionally, enforcement of traffic speed laws has been difficult due to the enormous number of roadways to be monitored by a relatively small number of police officers. The adoption of radar systems by police forces across the nation for use in apprehending violators of the speed laws has simplified the task of enforcing these laws. However, the effectiveness of radar systems has been greatly reduced by the introduction of radar detectors to the commercial market. These devices can detect the presence of police radar, allowing a motorist with a radar detector to reduce speed before being detected by the police radar system. Ironically, those motorists who show an intent to break speed laws by purchasing commercial radar detectors are the least likely to be apprehended for speeding violations.

The introduction of hand held radar guns has been somewhat successful in thwarting radar detector owners who break speed laws. With such a system, a police officer can aim a radar gun at a moving vehicle before actually turning on the system and generating a radar pulse. Nonetheless, these radar pulses are still picked up further down the road by radar detector owners, who react accordingly to avoid being apprehended.

SUMMARY OF THE INVENTION

The present invention provides an automatic radar transmitting system for simulating the presence of a police-manned radar station. The system includes a signal generator operating at a frequency and signal strength sufficient to cause an alert status in a radar detector when used to transmit a signal. A microwave antenna is included for transmitting the signal, along with a power source for providing electrical power to the system. Radar signal pulses are generated by the signal generator and transmitted through the antenna. The generation of pulses is controlled by a controller which provides control signals to the signal generator which control the signal power, pulse width, and pulse separation of the generated signals. The generation of the pulses is substantially random due to a randomizing program of the controller which selects the pulse width and pulse separation randomly from stored parameter ranges.

The power source of the radar transmitting system can be a battery which may be used in conjunction with a photovoltaic panel. The battery supplies electrical power to all the components of the system, and the photovoltaic panel collects solar energy and converts it to electricity which is regularly applied to the battery. The application of charge to the battery from the photovoltaic panel is governed by a charge control device responsive to the charge level of the battery. The charge control device prevents transfer of charge from the photovoltaic panel to the battery if the charge level of the battery reaches a predetermined maximum. This prevents overcharging of the battery.

The controller monitors the battery charge level and modifies the control of the signal generator if the charge level becomes too low. When such a reduction in charge level is detected, the controller responds by changing the parameters of the pulses generated by the signal generator to reduce power consumption. This may be accomplished by reducing the signal power of the pulses, or by shortening the pulse width and/or increasing the pulse separation. By modifying one or more parameters according to a predetermined function of power, preferably an incremental function, a remote receiver may be used to detect the status of the power supply. Thus, no additional power consuming alert signal need be provided.

The controller is responsive to external input signals from a radiation detector which receives coded radiation signals generated from a remote control. The external signals may be used to temporarily suspend operation of the system, or to input new signal parameters to be used by the controller in controlling the signal generator. The signal parameters may, for example, be dictated by new FCC regulations. To conserve power, the power to the radiation detector is controlled by the controller. The controller regulates the radiation detector power to a duty cycle. One external input signal is a preparatory signal which causes the controller to modify the regulation of the radiation detector power such as to provide continuous power to the radiation detector for a preestablished length of time. This allows a longer continuous period of detection time for receiving more complicated input signals which follow the preparatory signal.

A second microwave antenna may be used to transmit the same radar signal in a direction other than the transmitting direction of the first microwave antenna. This allows the radar transmitting system to cover a second region of interest with a signal from the same signal generator.

DESCRIPTION OF THE PREFERRED EMBODIMENT

Figure 1:
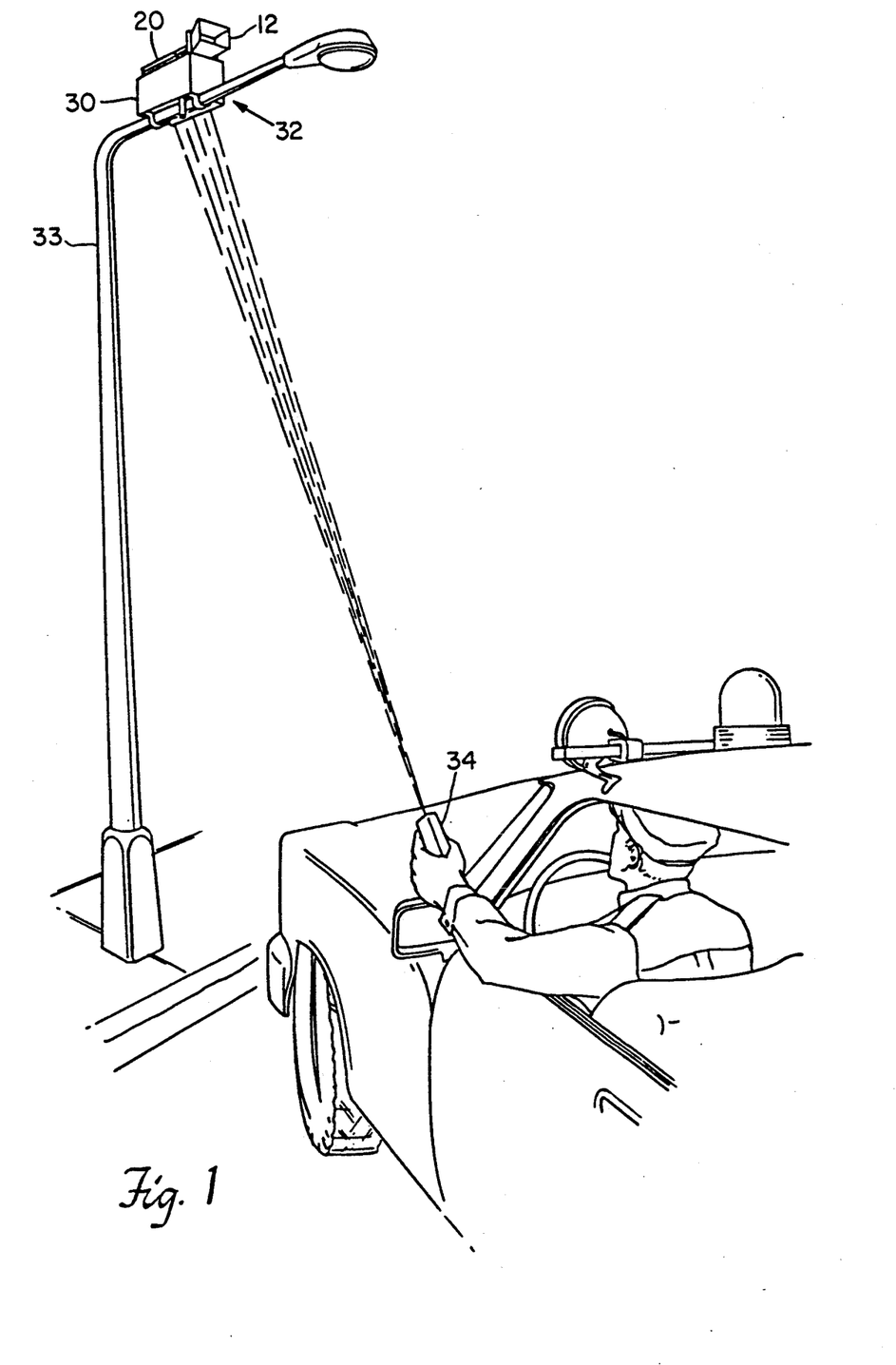
FIG. 1 shows the device mounted in a typical location, and a subject controlling the system with a remote control.

FIG. 1 shows a radar transmitting system 32 partially enclosed in a weatherproof casing 30, which will be described in detail later. A microwave antenna 12 and photovoltaic panel 20 are shown outside casing 30. The system 32 is mounted on a light post 33 over a roadway where it is likely to be used. It is one purpose of this invention to put forth a system which may be used on a state-wide level. By placing a radar transmitting system every several miles along every major highway in a state, the primary speeding zones in the state would be saturated with radar signals. Thus, a radar detector would be rendered effectively useless throughout the state. Because of the obvious threat of vandalism, the radar transmitting system must be autonomous. Power cords or control lines within easy reach would invite tampering.

The location of the device in FIG. 1 is out of reach and provides a good spot from which to transmit radar signals down the roadway. Other possible locations of the transmitting system are on road signs or highway overpasses. A typical user of the system, in this case a police officer, is shown with hand-held infrared transmitter 34. The transmitter 34 allows control of the system without the necessity of control wires being at ground level, which could be easily vandalized. The transmitter 34 transmits coded signals to which the controller in the radar transmitting system has been programmed to respond. The signal is received by an infrared detector which converts it to an electrical signal input.

Figure 2:
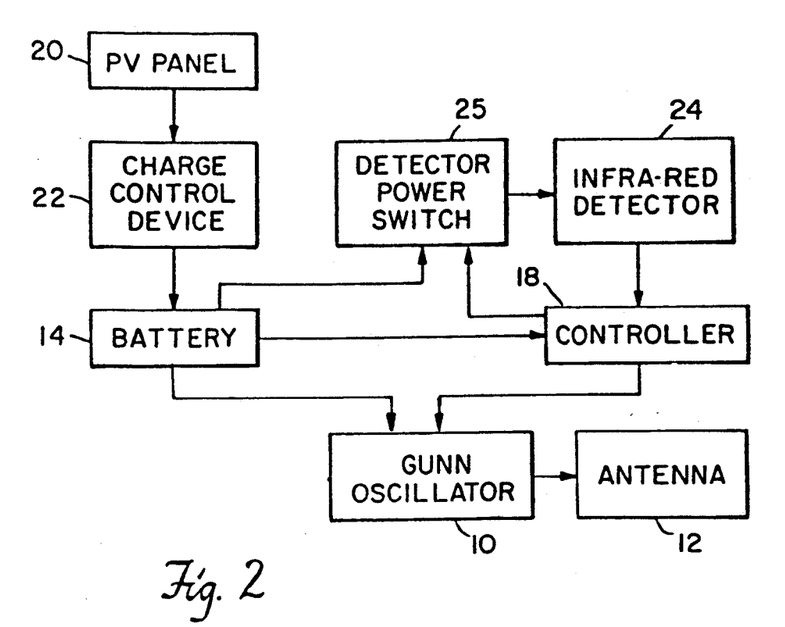
FIG. 2 shows a system block diagram with relative connectors between the blocks.

The block diagram of FIG. 2 shows the functional interaction of the components of a preferred embodiment of the radar transmitting system. The core of the system is a signal generator, which in this case is a Gunn oscillator 10, such as the M/A-Com 86651A for X-band or M/A-Com 86790A for K-band operation. The Gunn oscillator 10 is designed to generate radar signals, similar to those used for police speed sensing radar, to be output to a microwave antenna 12, such as the M/A-Com 86552 for K-band or M/A-Com 86554 for X-band. The signals typically generated are in the X-band or the K-band, as these are generally the bands monitored by commercial radar detectors. However, the system is not limited to these two bands. The requirement of the signal generator is that it generate a signal which when transmitted using the antenna 12 causes commercial radar detectors to signal an alert. The exact model of signal generator 10 and antenna is not critical as long as they satisfy this requirement. The design of Gunn oscillators and antennas is commonly known in the art, and they are commercially available with features to satisfy individual system requirements.

The parameters of the signal pulses output through antenna 12 from signal generator 10 are controlled by control signals input from controller 18. By utilizing simple switching electronics incorporated into the signal generator, control signals generated by the controller are used to change the signal output power, the pulse width, and the pulse separation of the output signals.

The controller is a digital logic circuit based on a microprocessor such as the Motorola 63HCC11. The controller 18 generates control signals which modify the power which reaches the signal generator 10 from the battery 14. The periodic control signals from the controller 18 cause the closing of an electronic switch which causes the generation of the desired radar signals. By controlling the amount of electrical power which is allowed to flow from the battery to the generator, the output signal power can be controlled. In the present embodiment, the output signal power is controlled in discrete levels. These discrete levels are provided by an analog-to-digital converter (ADC) which may be located either within the controller, or as part of the signal generator electronics. An analog switch such as a simple transistor circuit responds to the signal output from the ADC and is used to control the amount of electrical power which flows to the signal generator with each signal generation. A smooth analog scale of signal output power may also be used as an alternative to the discrete power levels.

The controller 18 controls signal generation by the signal generator 10 according to a pseudo-randomizing program stored in the controller. The program selects values for the signal duration (pulse width) and periodicity (pulse separation) of the generated pulses. Stored in the controller are predetermined numerical ranges from which each of these values is selected. The pseudo-randomizing program then selects a value from each of the provided ranges in a substantially random fashion. The range provided for the pulse width is from 1½ to 3½ seconds, and the time between pulses (pulse separation) ranges from 6 to 22 seconds.

The substantially random nature of the radar signals produced by the radar transmitting system is an important design feature. If the pulses were periodic, or if they all had the same pulse width, a circuit could be designed to detect the regular nature of the transmitting system and identify it as not being an actual police-manned radar station. Although a pseudo-randomizing program in a finite state machine must eventually repeat, the length of the repeating sequence is long enough that it cannot be detected before a motorist with a radar detector detecting the signal reaches the source of the radar.

To make the system truly autonomous, a method of recharging the battery 14 is required. The present embodiment includes photovoltaic panel 20 which collects solar radiation and converts it to electricity to be applied to the battery 14 for recharging purposes. To prevent the battery 14 from overcharging, a charge control device is placed between the battery 14 and the photovoltaic panel 20. The charge control device 22 acts as a voltage regulator by monitoring the charge on the battery 14 and restricting the flow of electricity from the photovoltaic panel 20 when the charge on the battery 14 reaches maximum. Such charge control devices are commonly known in the art and are commercially available, many designed to work specifically with photovoltaic elements.

The pseudo-random nature of the signal generation also conserves power in the system. The Gunn oscillator 10 consumes a considerable amount of power when operated, and it is not practical to power it continuously. Even with the solar panel 20, the drain on the battery 14 is too severe when the Gunn oscillator 10 is run continuously. For this reason, the control of the signal generator is also modified by the controller in response to the power level of the battery.

The controller has an input directly from the battery 14, as shown in FIG. 2. The controller not only draws power from the battery for its own needs, but also monitors the battery power level. Since an extended period of bad weather or dirt on the photovoltaic panel 20 might cause the power of the battery to be decreased to a substandard level, the controller responds to such a reduction in power by modifying the control of the signal generator output signals. Power saving techniques which can be used by the controller program include shortening the duration of the signal pulses, increasing the intervals between the pulses, and decreasing the signal power. The changing of the pulse width and pulse separation can be modified without changing the pseudo-random nature of the signal generation by changing the ranges from which the randomizing program draws. Thus, the advantages of the randomizing of the signals is not lost due to power reduction.

The reduction of signal power is also easily controlled by controlling the switching of the input power from the battery to the signal generator, as discussed previously. The discrete output power levels can also be used to test the systems performance from a remote location. Since it is not practical to waste battery power by issuing a distress signal when a system power loss occurs, the measuring of the system output power provides an easy assessment of system status. As the battery power level decreases, the signal output power is correspondingly lowered and/or the pulse width and pulse separation is modified. These changes in signal output may be readily detected by a conventional radar detector, and used to indicate system distress. In the preferred embodiment, the system power levels are discrete, such that once a particular level is reached, a distress situation can be recognized and the unit serviced accordingly. It is therefore not necessary to perform any physical examination of the unit to determine system status.

Also shown in the block diagram of FIG. 2 is an infrared detector 24 such as the Motorola MC 3373. The infrared detector receives coded infrared signals and converts them to electrical signals to be input to the controller 18. The infrared detector 24 allows the system to be turned on and off from a remote control unit. The controller 18 responds to the signals input through the infrared detector 24. In one control function, a particular signal input from the infrared detector 24 instructs the controller to suspend operation of the signal generator 10, causing the system to become idle. Upon receiving a second coded signal input from the infrared detector 24, the controller 18 reactivates the operational cycle of the signal generator 10. Thus, the system may be effectively switched on and off from a remote infrared transmitter, as shown in FIG. 1. Also included with controller 18 is a timing circuit which starts when operation of the signal generator 10 is suspended. After running for one hour, the timer times out and controller 18 restarts the operation cycle of signal generator 10. A police officer might suspend operation of the unit with the remote control unit in order to set up a radar station, and then be called away on an emergency. The one hour timer feature thereby ensures that the unit is reactivated automatically after an hour.

The infrared detector 24 is powered by battery 14 through a detector power switch 25 responsive to a control signal from controller 18. In an effort to conserve battery power, the infrared detector is run on a duty cycle, being powered up for one half second every 10 seconds. This duty cycle is generated by the controller 18 which enables or disables the detector power switch 25 according to a timing cycle program. To simplify the input of an infrared code signal to the controller 18 through infrared detector 24, the controller is also designed to respond to a preparatory input signal through the infrared detector. The preparatory signal is a simple signal such as a digital sequence of all high logic levels which would be transmitted for at least ten seconds. If the controller identifies this preparatory input signal during the one half second "on" period of the duty cycle, the controller closes the detector switch temporarily to provide continuous power to the infrared detector 24 for a selected period of time. In the preferred embodiment, the controller supplies a string of "on" signals to power the detector switch for one full ten second period of the duty cycle before resuming normal operation. The infrared detector 24 is at that time made ready to receive more complicated control signals used to alter system status.

The ability to alter the control parameters of the system by remote control is an important feature of the present invention. Changes to each of the pulse width, pulse separation, and signal output power parameters may be modified through access to the controller's program by remote control. Since the unit is made autonomous and has no control or power lines which could be tampered with at ground level, remote control is provided such that authorized users do not have to use a ladder or "cherry-picker" to modify the program of the controller. It is recognized that frequent access to the controller program might be necessary to turn the system off and on in order to set up an actual speed trap. However, the ability to modify the controller program also allows signal output parameters to be changed to meet changing requirements of the Federal Communications Commission, thus preventing the system from becoming prematurely obsolescent. Thus a user has the ability to modify the controller program by remote control to change any of the parameters of signal power, pulse width, or pulse separation.

Figure 3:
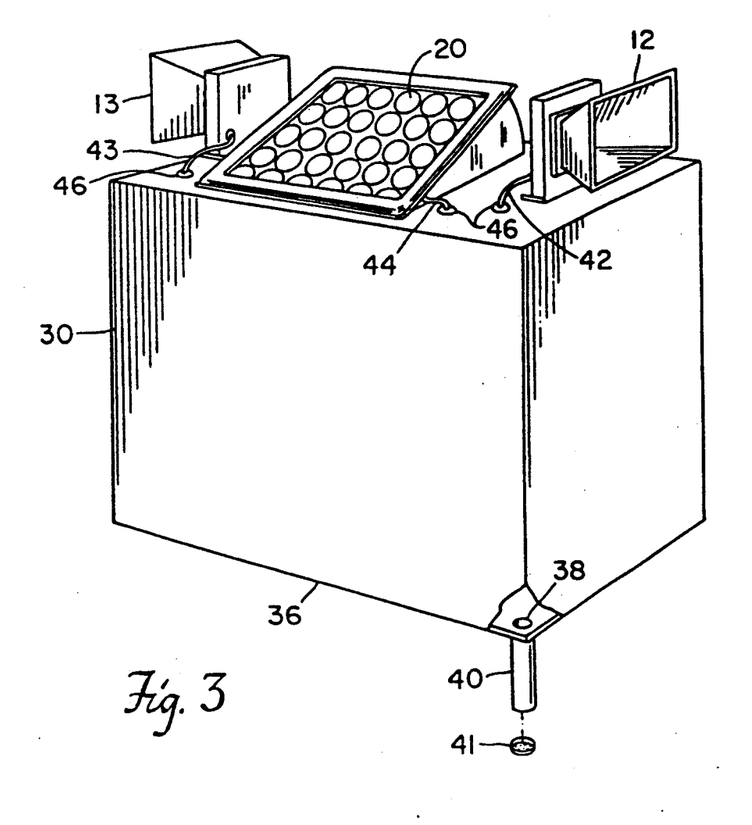
FIG. 3 shows two microwave antennas, the photovoltaic panel, and the weatherproof casing surrounding the system electronics with the drainage tube extending from the bottom of the casing.

To protect the delicate electronic circuitry of the radar transmitting system, an aluminium weatherproof casing 30 encloses all system components except the photovoltaic panel 20 and microwave antennas 12, 13. FIG. 3 shows the external casing 30 along with photovoltaic panel 20 and antennas 12, 13. The purpose of having two antennas 12, 13 is to allow the same signal from the Gunn oscillator to be transmitted in two different directions. This allows the unit to cover more area with the radar transmitter. One example for using both antennas is in the case where it is desirable to transmit towards cars travelling in both directions along a roadway. Thus, twice as many radar detector owners may be foiled with the same unit.

Photovoltaic panel 20 may be adjusted in angle and direction to maximize year round collection of solar radiation. The radar transmitting system of FIG. 3 is intended to be used in the vicinity of Boston, Mass., and the panel is therefore angled 57° toward the south to maximize efficiency. The panel may also be coated with a transparent shielding material such as Rain-X, produced by Uneko Corp. Such a coating is transparent to solar radiation and helps to keep the panel surfaces free from contamination. The slippery nature of the coating allows dirt and other accumulations to rinse away easily with a heavy rainfall.

The casing 30 is made of aluminium formed into a somewhat rectangular shape. Because the casing is aluminum, it is relatively easy to stamp holes in different parts of the casing for attaching a mounting bracket in a convenient location. A standard casing form may therefore be used for ease of manufacture. The unused holes can be plugged with rubber stoppers to seal the casing at these points.

The bottom portion 36 of casing 30 is designed to have an uneven surface, one corner of the surface being lower than the rest of the surface. A drainage hole 38 is punched in the bottom portion 36 at the low corner to allow condensation inside the casing to drain. The electronics within the casing will generate heat and retain a slightly higher temperature than the surface of the casing 30. Thus, moisture within the casing will condense out on the casing surface and drain out through the drainage hole 38. A drainage tube 40 leads downward from drainage hole 38 and channels moisture being drained through the drainage hole. The drainage tube 40 serves as an extended vertical channel which prevents moisture, dirt, and other undesirable substances from accidently entering the casing through drainage hole 38. The bottom of the drainage tube 40 is covered by a screen 41 to prevent any unwanted elements, such as insects, from entering the casing 30 through the drainage tube 40.

Antenna 12, 13 are foam filled to protect them from moisture, insects, and other undesirable environmental hazards. Antenna cables 42, 43 lead from the antennas 12, 13 through openings in the casing and to the Gunn oscillator. The photovoltaic panel 20 is completely weatherproof and has a cable 44 which leads through a hole in the casing 30 to the charge control device 22. Gasket seals 46 around all cables ensure that the outer casing 30 remains weathertight.

Figure 4:
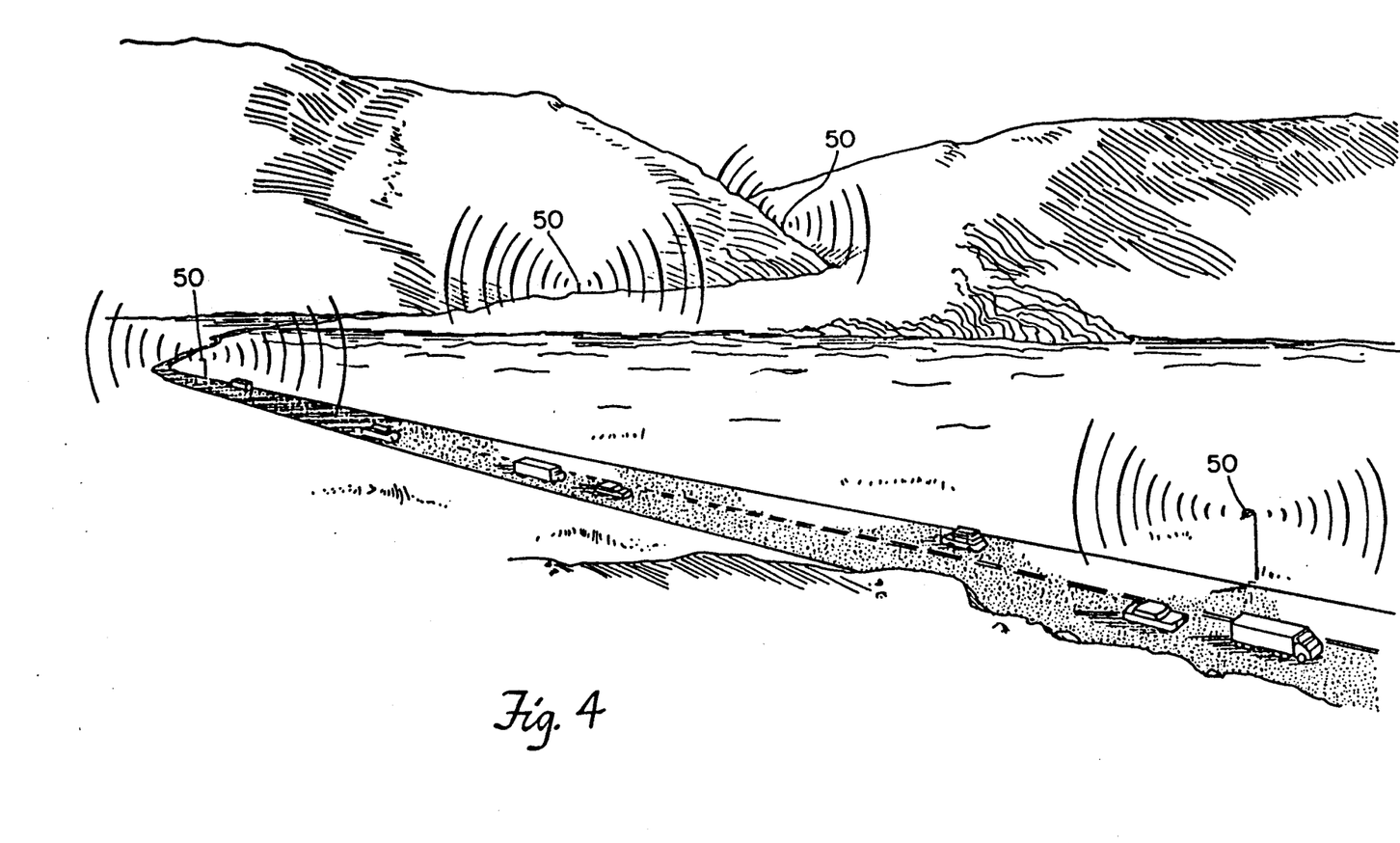
FIG. 4 shows a section of roadway with a radar transmitting system placed every several miles.

FIG. 4 shows a section of roadway with a radar transmitting system 50 placed every several miles. Each of these systems 50 is of the bidirectional type, as can be seen by the illustrated indication of the radar waves. This allows both directions along one area of roadway to be covered by one radar transmitting system 50. Spacing out the placement of the transmitters 50 in such a fashion provides a means to deter a radar detector owner from speeding along the roadway. If it was so desired, a police officer could turn off any or all of the transmitters and set up an actual radar trap. Such a system effectively removes the ability of the radar detector owner to break speed laws while avoiding radar traps.

I claim:

1. An automatic radar transmitting system for simulating the presence of a police-manned radar station, the system comprising:
   a radar signal generator for generating signals at a frequency and signal strength sufficient to cause an alert status in a radar detector when the signals are transmitted by a microwave antenna;
   a microwave antenna for transmitting radar signals from the signal generator;
   a power source for providing electrical power to the system;
   a radiation detector detecting external coded radiation signals and converting them to coded electrical input signals; and
   a controller comprising means for controlling the generation of said signals generated by the signal generator such that the radar signal output by the microwave antenna have particular parameters of pulse width, pulse separation, and signal power, the controller receiving said electrical input signals from the radiation detector, wherein one of said external input signals from the radiation detector causes the controller to suspend operation of the signal generator for a predetermined length of time after which the controller automatically reactivates the operation of the signal generator.

2. An automatic radar transmitting system for simulating the presence of a police-manned radar station, the system comprising:
   a radar signal generator for generating signals at a frequency and signal strength sufficient to cause an alert status in a radar detector when the signals are transmitted by a microwave antenna;
   a microwave antenna for transmitting radar signals from the signal generator;
   a power source for providing electrical power to the system;
   a radiation detector detecting external coded radiation signals and converting them to coded electrical input signals; and
   a controller comprising means for controlling the generation of said signals generated by the signal generator such that the radar signals output by the microwave antenna have particular parameters of pulse width, pulse separation, and signal power, the controller receiving said electrical input signals form the radiation detector, wherein the controller responds to predetermined coded electrical input signals form the radiation detector to modify the control of the signal generator to change said parameters of the signals generated by the signal generator.

3. The radar transmitting system of claim 2 wherein the controller comprises a microprocessor executing software program.

4. The radar transmitting system of claim 2, wherein one of said external input signals from the radiation detector causes the controller to suspend operation of the signal generator for a predetermined length of time.

5. The radar transmitting system of claim 2 wherein power to the radiation detector is controlled by the controller.

6. The radar transmitting system of claim 5, wherein the radiation detector is supplied with power on a duty cycle, at least until a predetermined radiation signal is detected.

7. The radar transmitting system of claim 6, wherein one of said electrical input signals is a preparatory signal received while the radiation detector is operating on the duty cycle, and the controller further comprises means for responding to the preparator signal by providing continuous power to the radiation detector.

8. The radar transmitting system of claim 2 wherein the power source comprises a battery and a photovoltaic panel, wherein the photovoltaic panel collects solar energy and converts it to electricity which is applied to the battery, replenishing change to the battery as charge is expended.

9. An automatic radar transmitting system for simulating the presence of a police-manned radar station, the system comprising:
   a radar signal generator for generating signals at a frequency and signal strength sufficient to cause an alert status in a radar detector when the signals are transmitted by a microwave antenna;
   a microwave antenna for transmitting radar signals from the signal generator;
   a power source for providing electrical power to the system, the power source comprising a battery and a photovoltaic panel, wherein the photovoltaic panel collects solar energy and converts it to electricity which is applied to the battery, replenishing charge to the battery as charge is expended;
   a radiation detector detecting external coded radiation signals and converting them to coded electrical input signals;
   a controller comprising means for controlling the generation of said signals generated by the signal generator such that the radar signals output by the microwave antenna have particular parameters of pulse width, pulse separation, and signal power, the controller receiving said electrical input signals from the radiation detector; and
   a charge control device through which the charge transfer from the photovoltaic panel to the battery is controlled, such tat when the charge to he battery reaches a predetermined maximum, the charge control device prevents charge transfer from the photovoltaic panel to the battery.

10. An automatic radar transmitting system for simulating the presence of a police-manned radar station, the system comprising:
- a radar signal generator for generating signals at a frequency and signal strength sufficient to cause an alert status in a radar detector when the signals are transmitted by a microwave antenna;
- a microwave antenna for transmitting radar signals from the signal generator;
- a power source for providing electrical power to the system, the power source comprising a battery and a photovoltaic panel, wherein the photovoltaic panel collects solar energy and converts it to electricity which is applied to the battery, replenishing charge to the battery as charge is expended;
- a radiation detector detecting external coded radiation signals and converting them to coded electrical input signals; and
- a controller comprising means for controlling the generation of said signals generated by the signal generator such that the radar signals output by the microwave antenna have particular parameters of pulse width, pulse separation, and signal power, the controller receiving said electrical input signals from the radiation detector, wherein the controller further comprises means for monitoring the charge level of the battery, and increasing the pulse separation of the signals generated by the signal generator as the charge level on the battery decreases.

11. The radar transmitting system of claim 2 further comprising a weatherproof casing housing components of the radar transmitting system.

12. The radar transmitting system of claim 11 wherein said weatherproof casing is aluminium.

13. The radar transmitting system of claim 11 wherein the weatherproof casing includes a drainage hole in the bottom portion of the casing, the hole being in a region of the bottom portion of the casing substantially lower than the rest of the bottom portion of the casing, such that moisture condensing on the inside of the casing will drain through the drainage hole.

14. The radar transmitting system of claim 13 further comprising a section of tubing sealed to and extending downward from the region of the bottom portion of the weatherproof casing surrounding the drainage hole.

15. The radar transmitting system of claim 14 further comprising a screen covering the open portion of the bottom of the section of tubing.

16. An automatic radar transmitting system for simulating the presence of a police-manned radar station, the system comprising:
- a radar signal generator for generating signals at a frequency and signal strength sufficient to cause an alert status in a radar detector when the signals are transmitted by a microwave antenna;
- a microwave antenna for transmitting radar signals from the signal generator;
- a power source for providing electrical power to the system;
- a radiation detector detecting external coded radiation signals and converting them to coded electrical input signals; and
- a controller comprising means for controlling the generation of said signals generated by the signal generator and the regulation of power provided from the power source to the radiation detector such that the radiation detector receives power on a duty cycle, the controller being responsive to said electrical input signals from the radiation detector, one of said electrical input signals being a preparatory signal in response to which the controller modifies the regulation of power to the radiation detector such as to allow continuous power to the radiation detector for a preestablished length of time.

17. An automatic radar transmitting system for simulating the presence of a police-manned radar station, the system comprising:
- a radar signal generator for generating signals at a frequency and signal strength sufficient to cause an alert status in a radar detector when the signals are transmitted by a microwave antenna;
- a microwave antenna for transmitting radar signals from the signal generator;
- a power source comprising a rechargeable battery for providing electrical power to the system; and
- a controller comprising means for controlling the generation of said signals generated by the signal generator such that the radar signals output by the microwave antenna have particular parameters of pulse width, pulse separation, and signal power, the controller further comprising means for detecting the charge level of the battery and responding to decreases in battery charge by changing said parameters of the signals generated by the signal generator so as to reduce the power consumed by the signal generator.

18. The radar transmitting system of claim 17 wherein the power source further comprises a photovoltaic panel which collects solar energy and converts it to electrical energy which is input to the battery.

19. The radar transmitting system of claim 17 wherein changing said parameters of the signals generated by the signal generator comprises decreasing the width of the generated pulses.

20. The radar transmitting system of claim 17 wherein changing said parameters of the signals generated by the signal generator comprises increasing the pulse separation of the generated signal.

21. The radar transmitting system of claim 17 wherein changing said parameters of the signals generated by the signal generator comprises decreasing the signal power of the generated pulses.

22. A method of automatically simulating the presence of a police-manned radar station, the method comprising:
- generating signals with a radar signal generator at a frequency and signal strength sufficient to cause an alert status in a radar detector when the signals are transmitted by a microwave antenna;
- providing a microwave antenna for transmitting radar signals from the signal generator;
- supplying electrical power with a power source;
- detecting external coded radiation signals with a radiation detector and converting them to coded electrical input signals; and
- controlling generation of said signals generated by the signal generator with a controller such that the radar signals output by the microwave antenna have particular parameters of pulse width, pulse separation, and signal power, the controller receiving said electrical input signals from the radiation detector and modifying the control of the signal generator in response thereto to change said parameters of the signals generated by the signal generator.

23. A method of automatically simulating the presence of a police-manned radar station, the system comprising:
generating signals with a radar signal generator at a frequency and signal strength sufficient to cause an alert status in a radar detector when the signals are transmitted by a microwave antenna;
providing a microwave antenna for directionally transmitting radar signals from the signal generator;
supplying electrical power with a power source;
detecting external coded radiation signals with a radiation detector which converts them to coded electrical input signals; and
controlling with a controller the generation of said signals generated by the signal generator and the regulation of power from the power source to the radiation detector such that the radiation detector receives power on a duty cycle, the controller responding to said electrical input signals from the radiation detector, one of said electrical input signals being a preparatory signal in response to which the controller modifies the regulation of power to the radiation detector such as to allow continuous power to the radiation detector for a preestablished length of time.

24. A method of simulating the presence of a police-manned radar station, the method comprising:
generating with a radar signal generator signals at a frequency and signal strength sufficient to cause an alert status in a radar detector when the signals are transmitted by a microwave antenna;
providing a microwave antenna for transmitting radar signals from the signal generator;
providing a power source comprising a rechargeable battery for supplying electrical power; and
controlling the generation of said signals generated by the signal generator with a controller such that the radar signals output by the microwave antenna have particular parameters of pulse width, pulse separation, and signal power, the controller detecting the charge level of the battery and responding to decreases in battery change by changing said parameters of the signals generated by the signal generator so as to reduce the power consumed by the signal generator.

* * * * *

UNITED STATES PATENT AND TRADEMARK OFFICE
CERTIFICATE OF CORRECTION

PATENT NO. : 5,122,802
DATED     : June 16, 1992
INVENTOR(S) : Jonathan Marin

It is certified that error appears in the above-identified patent and that said Letters Patent is hereby corrected as shown below:

In Claim 1, column 7, line 43, change "radar signal" to ---radar signals---.

In Claim 7, column 8, line 30, change "preparator" to ---preparatory---.

In Claim 9, column 8, line 65, change "such tat when the charge to he" to ---such that when the charge on the---.

In Claim 23, column 11, lines 8 and 9, change "for directionally transmitting" to ---for transmitting---.

Signed and Sealed this

Twenty-second Day of November, 1994

Attest:

BRUCE LEHMAN

Attesting Officer

Commissioner of Patents and Trademarks